United States Patent

Sato

(10) Patent No.: US 6,823,092 B1
(45) Date of Patent: Nov. 23, 2004

(54) IMAGE DATA REGISTERING APPARATUS AND METHOD, STORAGE MEDIUM, AND PROGRAM PRODUCT

(75) Inventor: Hirochika Sato, Kanagawa-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 621 days.

(21) Appl. No.: 09/718,365

(22) Filed: Nov. 24, 2000

(30) Foreign Application Priority Data

Nov. 30, 1999 (JP) .......................................... 11-340789

(51) Int. Cl.[7] .............................................. G06K 9/60
(52) U.S. Cl. ...................... 382/305; 382/190; 382/282; 382/306; 358/1.16; 358/537; 358/538; 711/297; 711/304; 711/507
(58) Field of Search ................................ 382/171, 175, 382/187, 189, 190, 282, 305, 306; 358/1.14, 1.15, 1.16, 1.17, 537, 538; 707/202, 204, 205; 711/152, 159, 161, 163, 164

(56) References Cited

U.S. PATENT DOCUMENTS

| | | | | |
|---|---|---|---|---|
| 4,965,437 A | * | 10/1990 | Nagai .......................... 235/381 |
| 5,164,831 A | * | 11/1992 | Kuchta et al. ............ 348/231.7 |
| 5,487,141 A | * | 1/1996 | Cain et al. .................... 345/764 |
| 5,880,778 A | * | 3/1999 | Akagi ....................... 348/218.1 |
| 5,926,633 A | | 7/1999 | Takagi et al. ................ 395/566 |
| 6,130,741 A | * | 10/2000 | Wen et al. ..................... 355/40 |
| 6,195,513 B1 | * | 2/2001 | Nihei et al. .................. 396/332 |
| 6,275,608 B1 | * | 8/2001 | Tezuka ......................... 382/175 |
| 6,362,893 B1 | * | 3/2002 | Francis et al. .............. 358/1.14 |

* cited by examiner

Primary Examiner—Bhavesh M. Mehta
Assistant Examiner—Yosef Kassa
(74) Attorney, Agent, or Firm—Fitzpatrick, Cella, Harper & Scinto

(57) ABSTRACT

A designating picture plane for designating image data to be registered on the basis of specific information read out from a detachable memory for storing image data and the specific information which specifies the image data is displayed. An area in which the image data is registered is designated. The image data designated by the designating picture plane is registered in the designated memory area.

12 Claims, 12 Drawing Sheets

FIG. 4

INDEX
USER NAME
FILE NAME
PRINT PRODUCT ID
PRINT FILE FORMAT
PRINT DATA PRESERVATION TERM
GENERATION TIME
NO. OF SHEETS
PAPER SIZE
PAPER DIRECTION
ENLARGEMENT/REDUCTION RATIO
LAYOUT
SINGLE/DUPLEX PRINT
PAPER EJECTION OPTION
AUTO PRINT MARK

FIG. 10

| | DESIGNATE PERSONAL BOX.<br>(00--99) | USAGE<br>58% |
|---|---|---|
| 701 — 00 | SATO'S BOX | 0% |
| 702 — 01 | UCHIYAMA'S BOX | 10% |
| 703 — 02 | TAKAHASHI'S BOX | 23% |

ENTER PASSWORD.           CANCEL — 802

[* * * *]

OK — 801

| INDEX | USER | PRINT DATA | DELETION TIME |
|---|---|---|---|
| 1 | SATO | DOCUMENT 1. doc | 99/07/30 20 : 03 |
| 2 | UCHIYAMA | FUJI. jpg | 99/07/31 11 : 45 |
| 3 | TAKAHASHI | SCHEDULE . txt | 99/07/31 12 : 14 |
| ⋮ | ⋮ | ⋮ | ⋮ |

IMAGE DATA REGISTERING APPARATUS AND METHOD, STORAGE MEDIUM, AND PROGRAM PRODUCT

BACKGROUND OF THE INVENTION

1. Field of the Invention

The invention relates to image data registering apparatus and method, a storage medium, and a program product, for registering image data stored in a detachable memory.

2. Related Background Art

An image input/output (I/O) apparatus connected to a host computer through a network receives PDL (page description language) data such as document data, image data, or the like formed on the host computer and transmitted therefrom, develops it from the received PDL to a bit map image, stores it onto a built-in hard disk, reads out the image data from the built-in hard disk, and prints it out.

The built-in hard disk is logically divided and the divided area can be allocated to an individual or a group. The divided area allocated as mentioned above is called a personal box.

The personal box on the hard disk built in the image I/O apparatus is designated from the host computer and print data can be stored in the designated personal box. However, to read out the print data stored in the personal box, it is necessary that a password for accessing to the personal box is inputted from an operating unit of the image I/O apparatus. It is possible to prevent a risk such that the print data is printed out by a third party who does not know the password.

According to such an image I/O apparatus, the print data can be deleted by the manual operation from the operating unit of the image I/O apparatus lest there is no empty area of the personal box is eliminated due to the accumulated print data, and after the elapse of a preservation term which has been preset for the personal box, the accumulated data can be automatically deleted.

There has also been known an image input/output apparatus such that in addition to such a function, an image data file and a DPOF (Digital Print Order Format) file is read out from a removable external storage medium for use in storage of an image file by a digital camera and stored onto a hard disk built in the image I/O apparatus, and the image data can be read out from the hard disk and printed out.

The DPOF is a format for recording auto print-out information (property). The DPOF file (property file) is a text file. Information regarding a user name, an address, a telephone number, kind of print, the number of sheets, a format of the image file, etc. is included in the DPOF file. As features of the DPOF file, the following features can be mentioned: namely, a structure is simple; a burden on equipment is light; it does not depend on an image format or a directory structure; one DPOF file has properties of a plurality of image files; and an arbitrary recording medium such as CF, smart media, FD, or the like can be used.

An image input/output apparatus which can directly read out the print data stored in the removable external storage medium as mentioned above does not exist. On the host computer side, the print data is read out of the removable external storage medium and the read-out print data is transmitted to the image I/O apparatus. Print conditions are set from the host computer or the operating unit of the image I/O apparatus. As mentioned above, it is very inconvenient to use the removable external storage medium as a storage medium of the image I/O apparatus itself.

The image files stored in the personal boxes from the removable external storage medium are preserved only for a predetermined fixed preservation term and automatically deleted after the elapse of the preservation term, so that the user cannot manage the preservation term of the print data.

SUMMARY OF THE INVENTION

It is the first object of the invention to solve the foregoing problems and provide image processing apparatus and method, in which image formation data which has print conditions and has been stored in a removable external storage medium can be stored from the image processing apparatus to a personal box.

It is the second object of the invention to solve the foregoing problems and provide image processing apparatus and method, in which a preservation term in a personal box which has previously been stored in a removable external storage medium can be preferentially set.

To accomplish the above objects, according to the invention, there is provided an image data registering apparatus comprising: connecting means for connecting a detachable memory for storing image data and specific information which specifies the image data; display means for displaying a designating picture plane for designating the image data to be registered on the basis of the specific information read out from the memory; area designating means for designating an area in which the image data is registered; and registering means for registering the image data designated by the designating picture plane into the memory area designated by the area designating means.

To accomplish the above objects, according to the invention, there is provided an image data registering apparatus comprising: connecting means for connecting a detachable memory for storing image data and specific information which specifies the image data; area designating means for designating an area in which the image data is registered; and registering means for registering the image data specified by the specific information read out from the memory into the memory area designated by the area designating means.

To accomplish the above objects, according to the invention, there is provided an image data registering apparatus comprising: connecting means for connecting a detachable memory for storing image data and information showing a preservation term of the image data; registering means for registering the image data read out from the memory; and deleting means for deleting the image data registered by the registering means on the basis of the information read out from the memory and showing the preservation term.

BRIEF DESCRIPTION OF THE DRAWINGS

FIG. 4 is a diagram showing an example of contents in a property file;

FIG. 10 is a diagram showing an example of a personal box designating picture plane;

FIG. 11 is a diagram showing an example of a password entering picture plane;

DETAILED DESCRIPTION OF THE PREFERRED EMBODIMENTS

Embodiments of the invention will now be described hereinbelow with reference to the drawings.

First Embodiment

Figure 1:
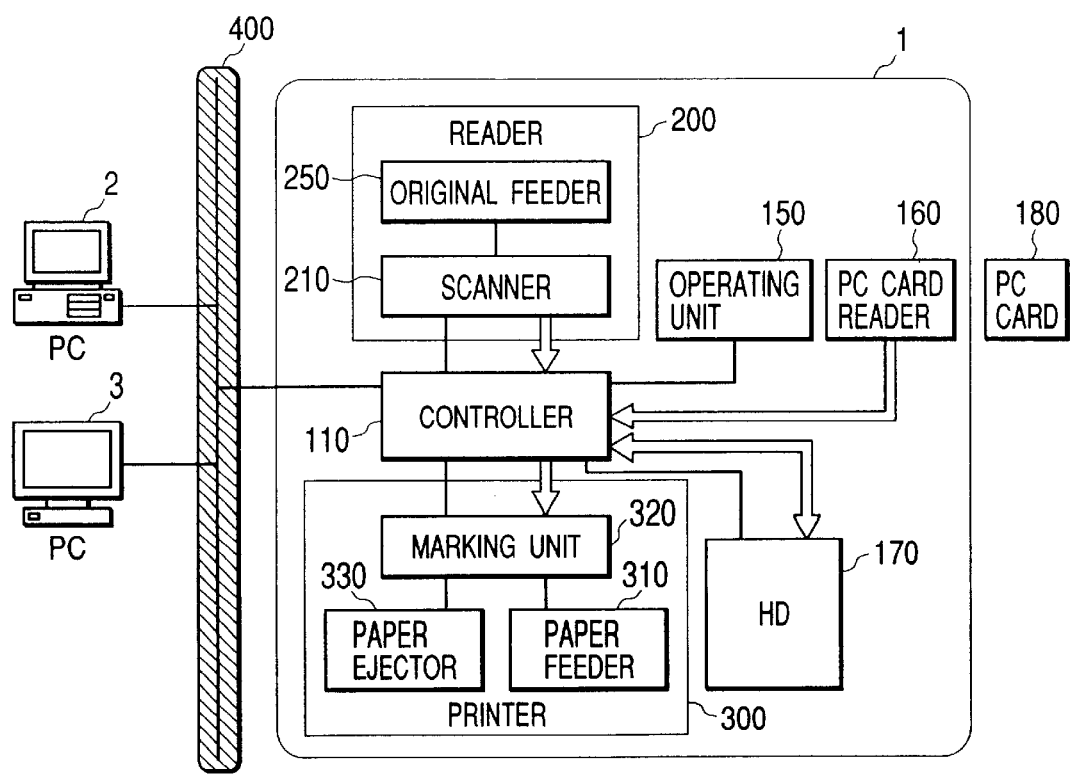
FIG. 1 is a block diagram showing the first embodiment of the invention.

FIG. 1 shows an embodiment of the invention and relates to an example of an image input/output (I/O) system. In the image I/O system, an image input/output (I/O) apparatus 1 and host computers 2 and 3 are mutually connected through a network 400.

The image I/O apparatus 1 has a reader 200, a controller 110, a printer 300, an operating unit 150, a PC card reader 160, a hard disk 170. The controller 110, operating unit 150, PC card reader 160, and hard disk 170 are mutually connected through a bus.

The reader 200 has an original feeder 250 and a scanner 210. The original feeder 250 feeds an original paper to the scanner 210. The scanner 210 optically reads an image on the original fed by the original feeder 250 and converts it into image data.

The printer 300 has a paper feeder 310, a marking unit 320, and a paper ejector 330. The paper feeder 310 has a plurality of kinds of recording paper cassettes. The marking unit 320 transfers and fixes an image onto the recording paper supplied from the recording paper cassette. The paper ejector 330 sorts and staples the recording papers on which the images have been recorded and ejects them out of the printer 300.

The controller 110 controls the reader 200, printer 300, operating unit 150, PC card reader 160, and hard disk 170. The controller 110 converts the image data read out by the reader 200 into code data, transmits the code data to the host computers 2 and 3 through the network 400, converts the code data received from the host computers 2 and 3 through the network 400 into image data, and outputs it to the printer 300.

The operating unit 150 has a liquid crystal touch panel and functions as a user I/F with the image I/O apparatus 1.

Figure 2:
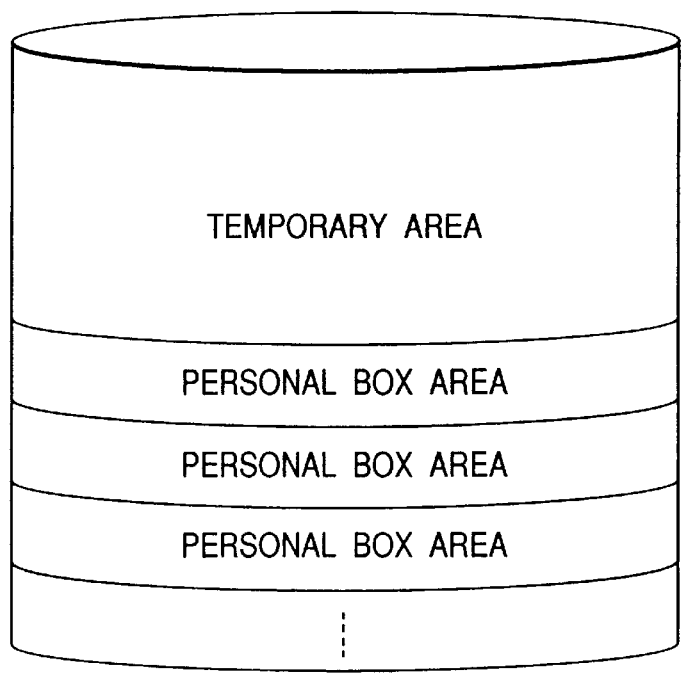
FIG. 2 is a diagram showing an example of a logical division of a hard disk 170 in FIG. 1.

As shown in FIG. 2, the hard disk 170 is logically divided into one temporary area and a plurality of personal box areas. The temporary area is a memory area for temporarily storing the development data of the PDL or the image data from the scanner 210 so as to enable an outputting order of the image data to be changed or enable the data to be outputted by one scan even in case of outputting a plurality of sheets. The personal box area is a memory area for using a personal box function.

The personal box function is a function such that in case of printing out a confidential document or the like, a personal box on the hard disk 170 is designated from the host computer 2 or 3, scanner 210, or operating unit 150, an image is transferred, and it is outputted to a paper from the operating unit 150.

The personal box can be allocated to each user or each division in a company or the like. A personal box name and a password can be added to each personal box.

The user can access to each personal box by designating the personal box name from the operating unit 150. When the user does not enter the password from the operating unit 150, he cannot actually see the contents in the personal box or output data to the paper.

Figure 3:
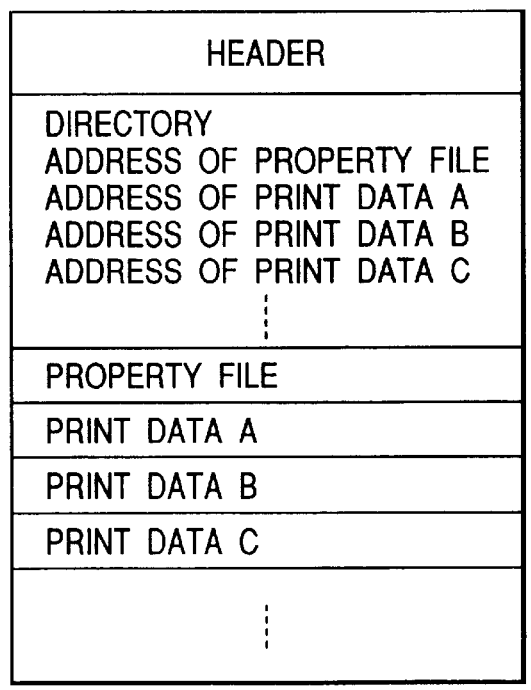
FIG. 3 is a diagram showing an example of a memory map of a PC card 180.

A PC card 180 is a removable external storage medium. As shown in FIG. 3, the print data and a property file describing the property regarding each print data have been stored in the PC card 180. The property file is a file of a text format fundamentally using the ASCII (American Standard Code for Information Interchange) code and designation information is described so as to be completed every print job. As for the property files, one property file exists in the PC card and a memory location of the target print data is not determined.

For example, parameters for each image data described in the property file are as shown in FIG. 4. User information, recording date and time, a file format, and print conditions in the print data are included in the property file. A print data preservation term as one of the elements of the parameters denotes a period of time which is required from the timing when the print data in the PC card has been stored in the personal box on the hard disk 170 to the timing when it is deleted.

The property file includes auto print information for specifying the print data which the user wants to automatically print among a plurality of print data, for example, print data A and print data C, and the user can designate those data by a digital camera.

When the storage medium in which the print data and the property file have been stored is set into a printer or the like by the user and an automatic printing is performed, the print data is specified from auto print mark information and a desired image is automatically printed. Therefore, the property file is also called auto print information.

The PC card reader 160 detects an attachment/removal of the PC card 180 and reads out the print data and property file stored in the PC card 180.

Figure 5:
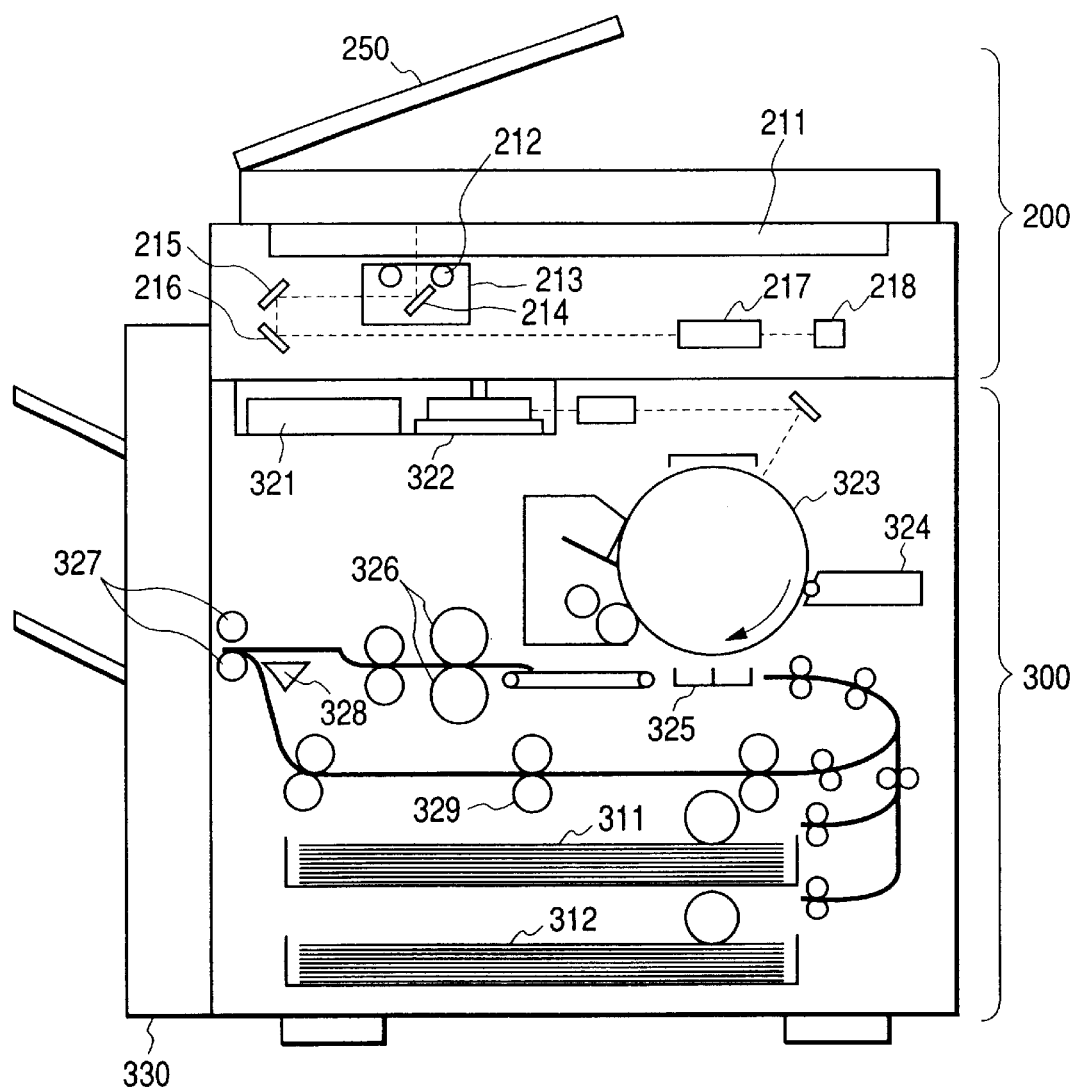
FIG. 5 is a cross sectional view showing an example of a structure of an image processing apparatus of FIG. 1.

FIG. 5 shows a structure of the image I/O apparatus 1 in FIG. 1. First, the reader 200 will be described. Reference numeral 250 denotes the original feeder for feeding originals one by one onto a platen glass 211 and ejecting the original on the platen glass 211 after completion of the reading operation of the original. Reference numeral 213 denotes an optical unit which has a lamp 212 and a mirror 214 and optically scans the original put on the platen glass 211. The lamp 212 is used for illuminating the original. The mirror 214 guides reflection light from the original toward a lens 217 in cooperation with mirrors 215 and 216. Reference numeral 218 denotes a CCD image sensor for converting an optical signal transmitted through the lens 217 into an electric signal. Image data generated from the CCD image sensor 218 is subjected to predetermined processes and, thereafter, transferred to the controller 110 (FIG. 1).

The printer 300 will now be described. Reference numeral 321 denotes a laser driver for driving a laser emitting unit 322 on the basis of the image data from the controller 110. A photosensitive drum 323 is exposed and scanned by a laser beam emitted from the laser emitting unit 322, so that a latent image is formed on the photosensitive drum 323. Reference numeral 324 denotes a developing unit for developing the latent image on the photosensitive drum 323 by a developing agent.

Reference numerals 311 and 312 denote cassettes in which recording papers have been enclosed. The recording papers enclosed in the cassettes 311 and 312 are conveyed one by one to a transfer unit 325 at a timing synchronized with the start of the irradiation of the laser beam. Reference numeral 325 denotes the transfer unit for transferring a toner image on the photosensitive drum 323 onto the recording paper and 326 indicates a fixing unit for fixing the toner image on the recording paper by a heat and a pressure.

Reference numeral 327 denotes ejecting rollers for ejecting the recording paper on which the image was fixed to the paper ejector 330. In the paper ejector 330, the ejected recording papers are collected and sorted, or the sorted recording papers are stapled as necessary.

Reference numeral 328 denotes a flapper for guiding the recording paper after the image was fixed to a paper refeed conveying path 329 in cooperation with the ejecting roller 327 which was reversely rotated. The recording paper guided to the paper refeed conveying path 329 is supplied to the transfer unit 325 at a proper timing for the purpose of a duplex recording.

Figure 6:
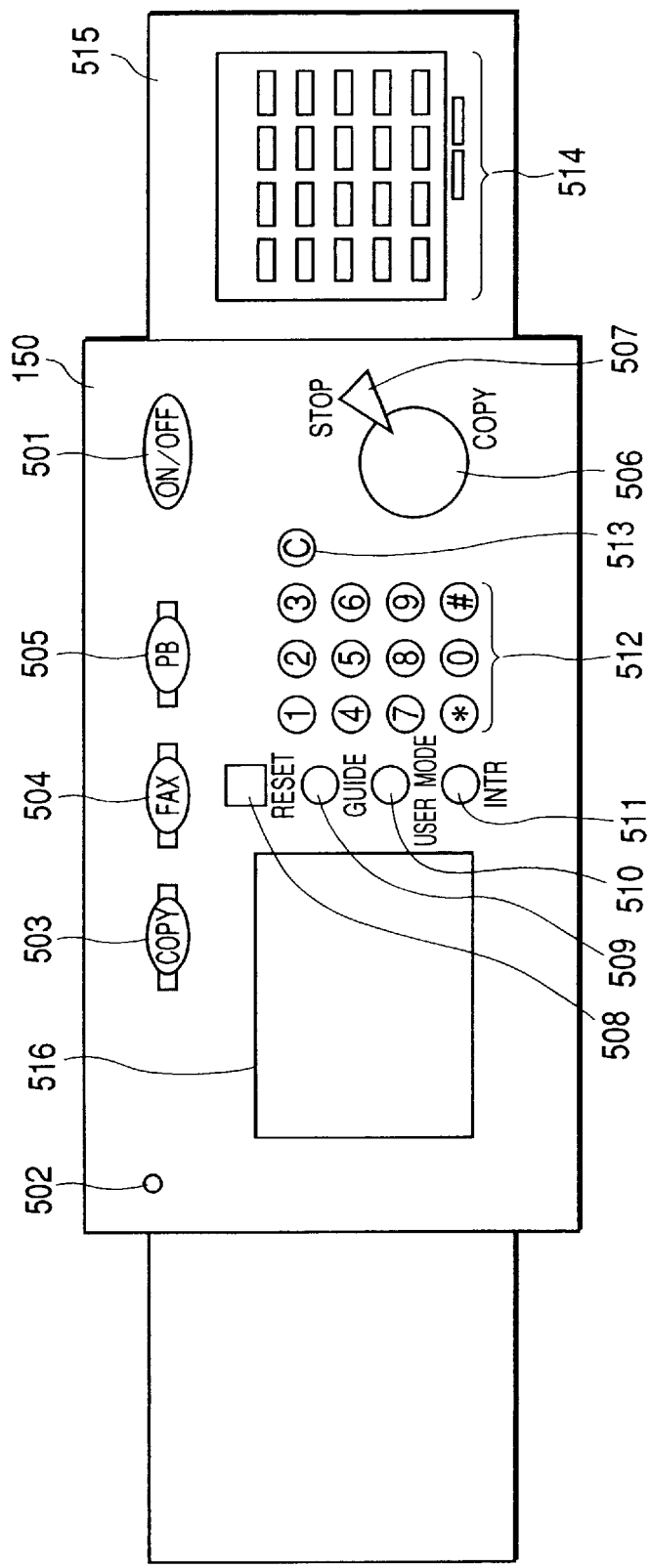
FIG. 6 is a diagram showing an example of a key arrangement of an operating unit 150 in FIG. 1.

FIG. 6 shows the operating unit 150 in FIG. 1. In FIG. 6, reference numeral 501 denotes a power switch for turning ON/OFF a power source; 502 a power lamp for showing the ON/OFF state of the power source; 503 a copy function select key for selecting a copy function; 504 a fax function select key for selecting a facsimile function; and 505 a personal box select key for selecting a personal box function.

Reference numeral 512 denotes a ten-key which is used for inputting a numerical value in case of setting the number of image forming sheets or setting an operating mode. In case of a facsimile setting picture plane, the ten-key is used for inputting a telephone number. Reference numeral 513 denotes a clear key which is used for invalidating the setting inputted by the ten-key 512; and 508 denotes a reset key which is used for resetting the mode of the set number of image forming sheets, the set operating mode, a selection paper feeding stage, or the like to a default value.

Reference numeral 506 denotes a start key for starting the image formation and 507 indicates a stop key for stopping the copying operation.

Reference numeral 516 denotes a touch panel which can display a setting picture plane every mode. The user can perform various detailed settings by pressing touch keys. Reference numeral 509 denotes a guide key for allowing a description of a key whose function is not known to be displayed on the touch panel 516; 510 a user mode key which is used for changing the setting of the copying apparatus; and 511 an interrupt key which is used when the user wants to perform another operation during the image forming operation.

Reference numeral 514 denotes 20 one-touch dial keys which are used when the user dials a desired telephone number by pressing the corresponding one-touch dial key in a facsimile transmission. Reference numeral 515 denotes double panels in which through-holes are formed so as not to interfere with each key of the one-touch dial keys 514. One of a first state where the two panels are closed, a second state where the first panel is closed, and a third state where the two panels are opened is detected by a sensor switch (not shown). The double panels 515 function as total 60 keys by a combination of the first to third states and the one-touch dial keys 514.

Figure 7:
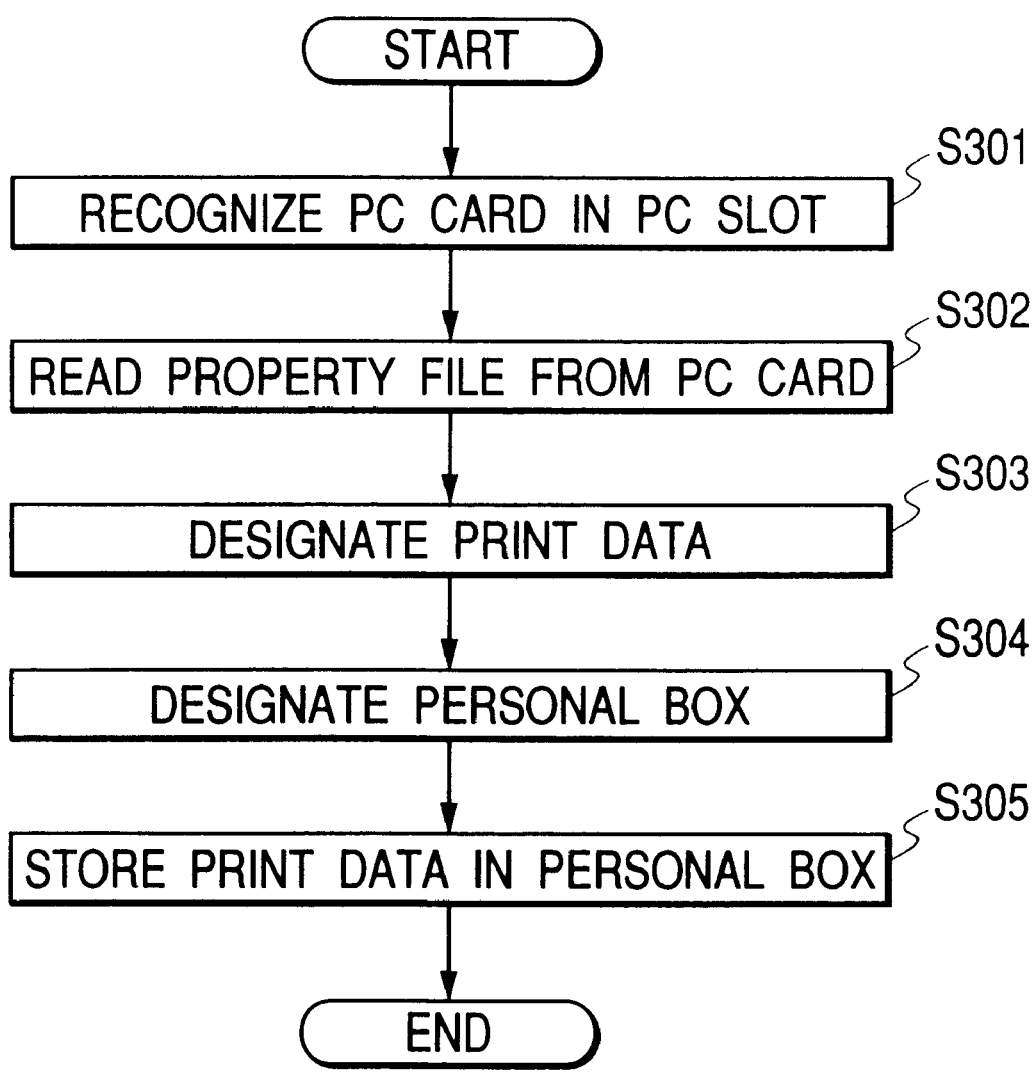
FIG. 7 is a flowchart showing an example of procedure for storing print data into a personal box by a controller 110 in FIG. 1.
Figure 8:
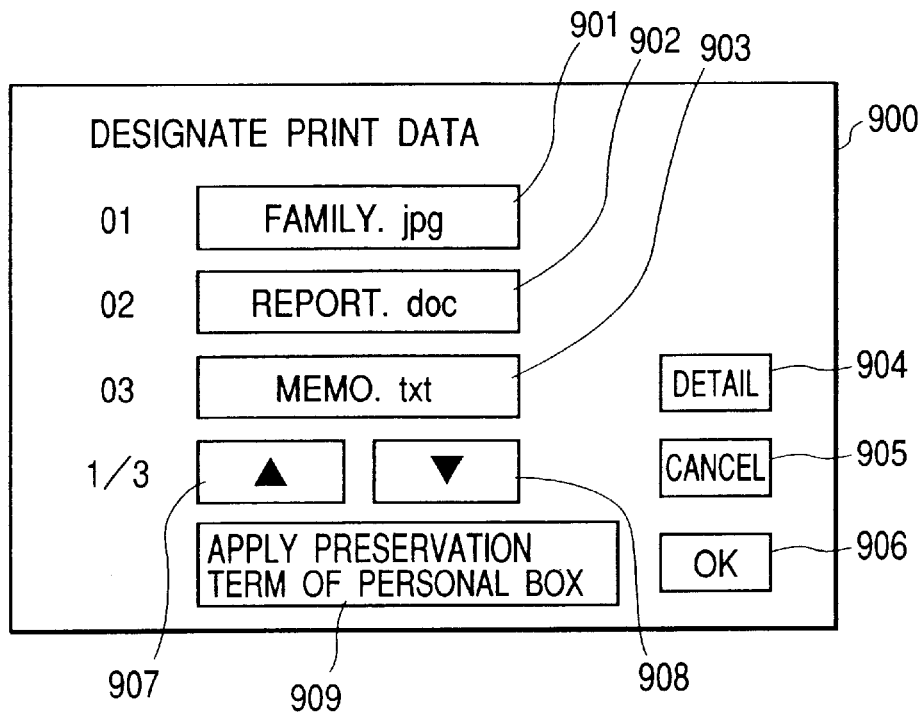
FIG. 8 is a diagram showing an example of a print data designating picture plane.

FIG. 7 is a flowchart showing an example of a procedure for storing the print data into the personal box by the controller 110 in FIG. 1. In step S301, when it is recognized that the PC card 180 has been loaded into a PC slot of the image I/O apparatus 1, a print data designating picture plane is displayed on the operating unit 150. In step S302, only the property file is read out from the PC card 180 and the image data file name is displayed on the print data designating picture plane. FIG. 8 shows an example of the print data designating picture plane. In FIG. 8, a numerical value written on the left side of the image data file name shows an index of the print data. Reference numerals 907 and 908 denote scroll keys for scrolling the image data file.

Figure 9:
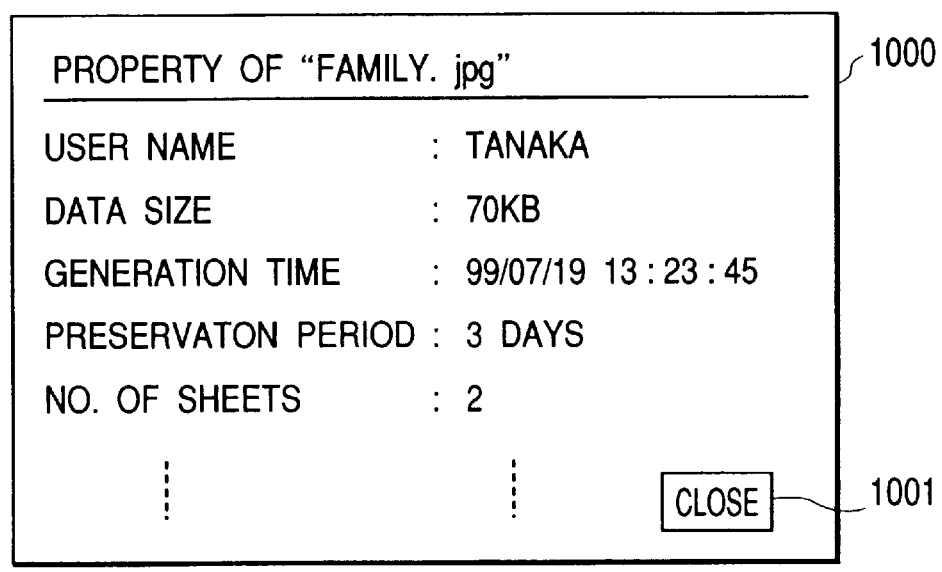
FIG. 9 is a diagram showing an example of a property detailed display picture plane.

For example, when a print data designate key 901 is operated and a detailed key 904 is subsequently operated, a detailed property regarding the print data whose image data file name is "family. jpg" is read out from the property file. The screen is switched from the print data designating picture plane to a detailed property picture plane as shown in FIG. 9. When a close key 1001 in FIG. 9 is operated, the screen is returned to the print data designating picture plane in FIG. 8.

In step S303, when one of print data designate keys 901, 902, and 903 is operated and an OK key 906 is subsequently operated, the screen is switched from the print data designating picture plane to a personal box designating picture plane.

For example, when the print data designate key 901 is operated and the OK key 906 is operated, a personal box designating picture plane as shown in FIG. 10 is displayed. In FIG. 10, numerical values written on buttons 701 to 703 denote personal box numbers. A percentage displayed on the right side of each personal box column indicates a use degree for a memory capacity of the personal box area (FIG. 2). For example, "TAKAHASHI'S box" denotes that 23% of the capacity in the personal box area is used.

In step S304, when one of the buttons 701 to 703 on the personal box designating picture plane is operated, the screen is switched from the personal box designating picture plane to a password entering picture plane as shown in FIG. 11. Subsequently, when a correct password is entered from the password entering picture plane, the print data and the print conditions of the PC card 180 are stored in the designated personal box in step S305.

The picture plane in FIG. 11 can be finished by pressing an OK key 706.

In this example, explanation has been made with respect to the case where when one of the print data designate keys 901 to 903 is operated and the OK key 906 is subsequently operated, the screen is switched from the print data designating picture plane to the personal box designating picture plane in step S303. However, it is also possible to automatically designate the print data designated by the auto print mark in step S303 if the auto print mark information exists.

Figure 12:
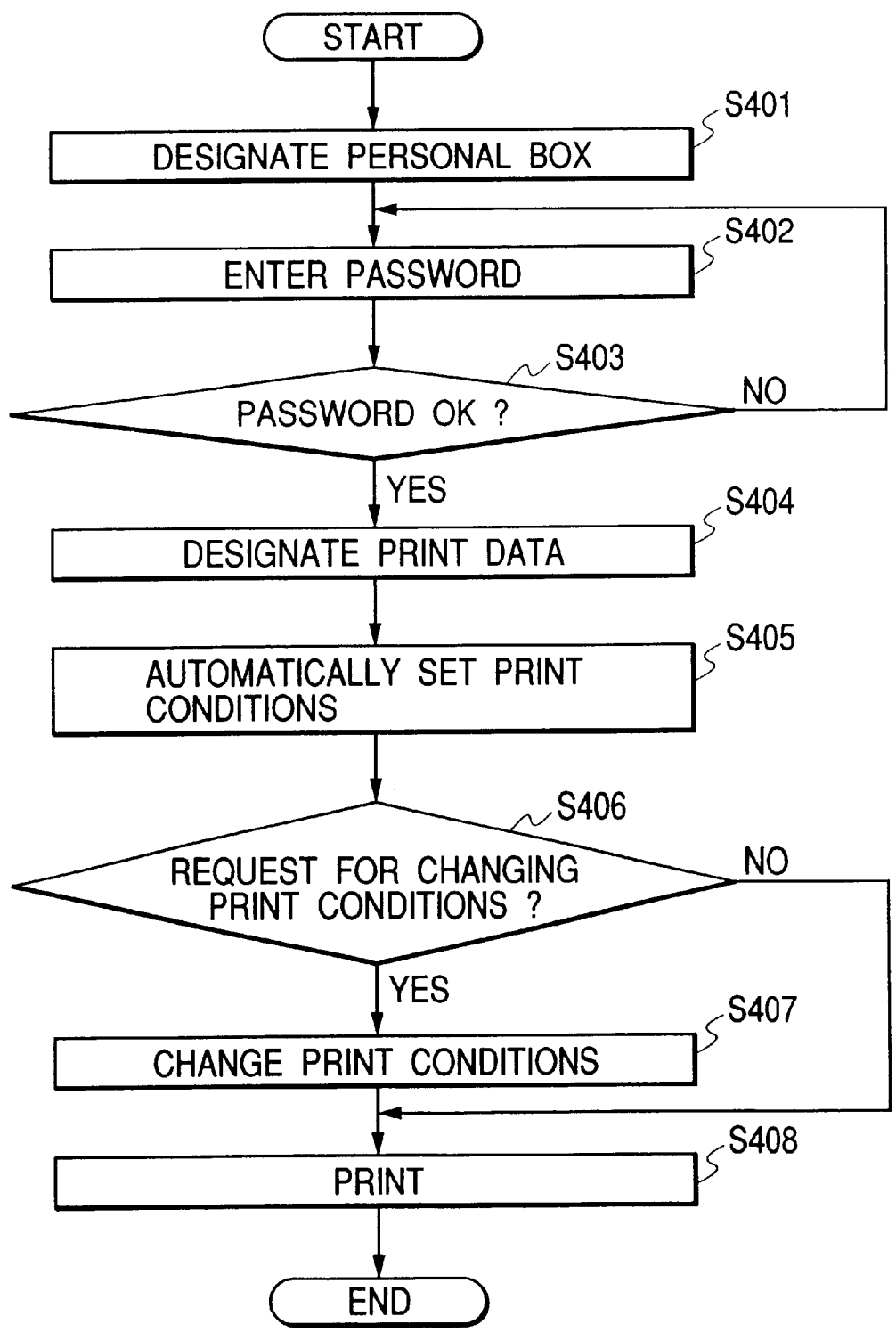
FIG. 12 is a flowchart showing an example of a printing procedure by the controller 110 in FIG. 1.

FIG. 12 is a flowchart showing an example of a printing procedure by the controller 110 in FIG. 1. When one of the buttons 701 to 703 is operated and the personal box is designated in step S401 in a state where the personal box designating picture plane as shown in FIG. 10 is displayed, the screen is switched from the personal box designating picture plane to the password entering picture plane shown in FIG. 11. When the correct password is entered from the password entering picture plane in steps S402 and S403, the screen is switched to a picture plane for designating print data in the personal box.

When the image data file is designated, the print conditions for the designated image data file, namely, the print conditions described in the property file are set into the image I/O apparatus in step S405. Whether there is a changing request of the print conditions or not is discriminated in step S406. If it is determined that there is the changing request, the print conditions are changed on the basis of the change contents from the operating unit 150 in step S407. That is, the property file is read and the print conditions described in the property file, for example, a paper size, a paper direction, an enlargement/reduction ratio, a layout, and a single/duplex print are applied. On the other hand, if it is determined that there is not the changing request, the image data is supplied to the printer 300 and the image is printed by the printer 300 on the basis of the supplied image data in step S408.

Second Embodiment

The user operates the operating unit 150 in FIG. 1 and can set a default preservation term of the print data in each personal box. A unit of the preservation term to be set can be selected from year, month, day, time, and the like.

Figure 13:
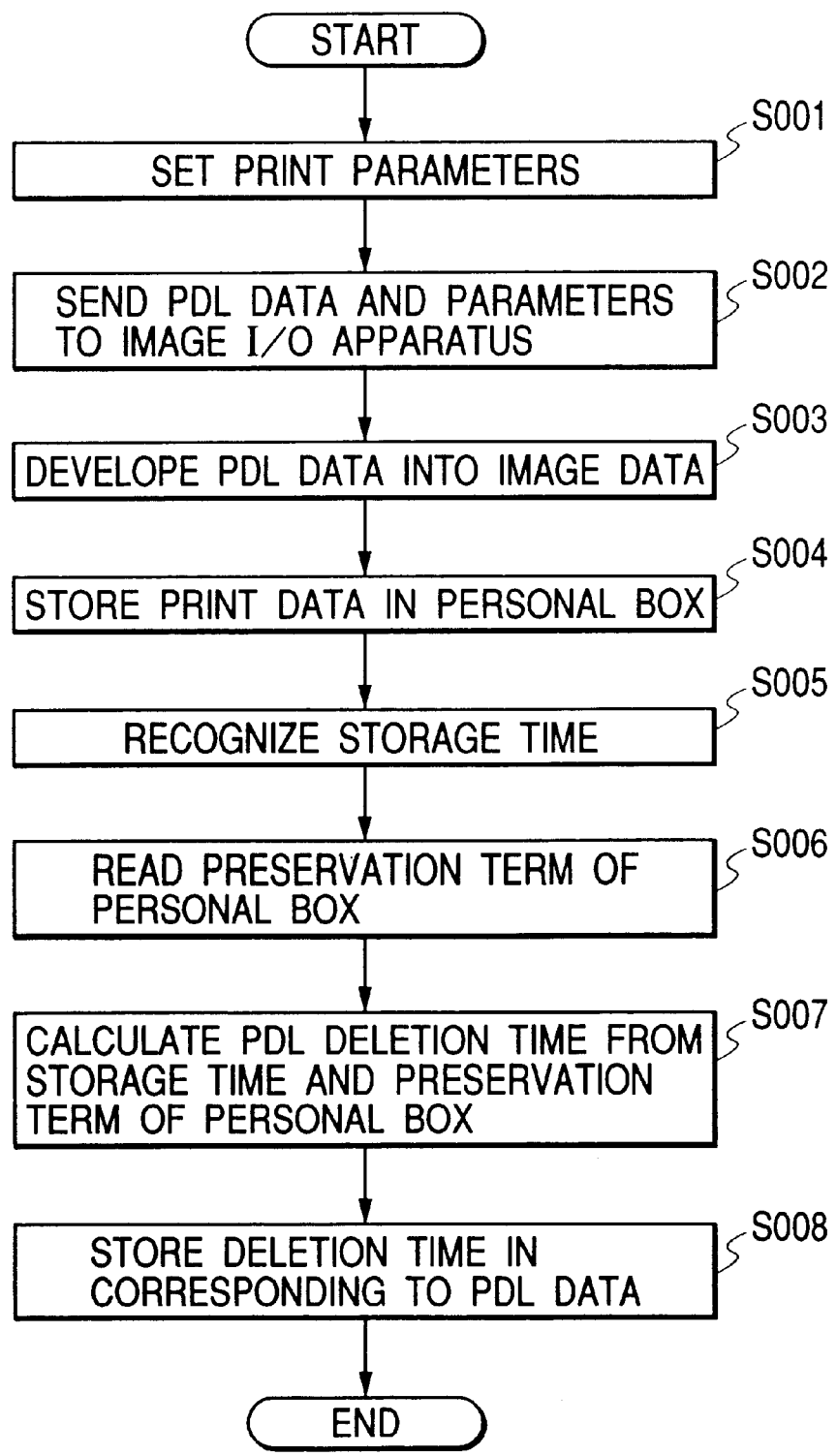
FIG. 13 is a flowchart showing an example of a processing procedure by the controller 110 in FIG. 1 after PDL data was received from a host computer 2.

FIG. 13 is a flowchart showing an example of a processing procedure by the controller 110 in FIG. 1 after the PDL data was received from, for example, the host computer 2. In step S001, print setting parameters, namely, the number of sheets, paper size, enlargement/reduction ratio, single/duplex print, page outputting order, sort output, the presence or absence of stapling, number of the personal box to store the image data file, and the like are set on the host computer 2 by the user. In step S002, when a print instruction is issued on the host computer 2 from the user, code data serving as a print target is converted into, what is called PDL data in accordance with driver software on the host computer 2. The obtained PDL data and the set print setting parameters are transferred to the image I/O apparatus 1 through the network 400.

When the PDL data and the print setting parameters are received through the network 400, the received PDL data is developed (rasterized) into the image data in step S003. In step S004, the image data after completion of the development is sequentially stored together with the received print setting parameters into the personal box to which the personal box number serving as a print setting parameter has been allocated.

The time when the PDL data has been stored in the personal box is recognized in step S005. A preset preservation term of the relevant personal box is read out in step S006. A deletion time of the PDL data in the relevant personal file is calculated on the basis of the recognition time and the read-out preservation term in step S007. The obtained deletion time is stored in correspondence to the PDL data in the relevant personal file in step S008.

Figure 14:
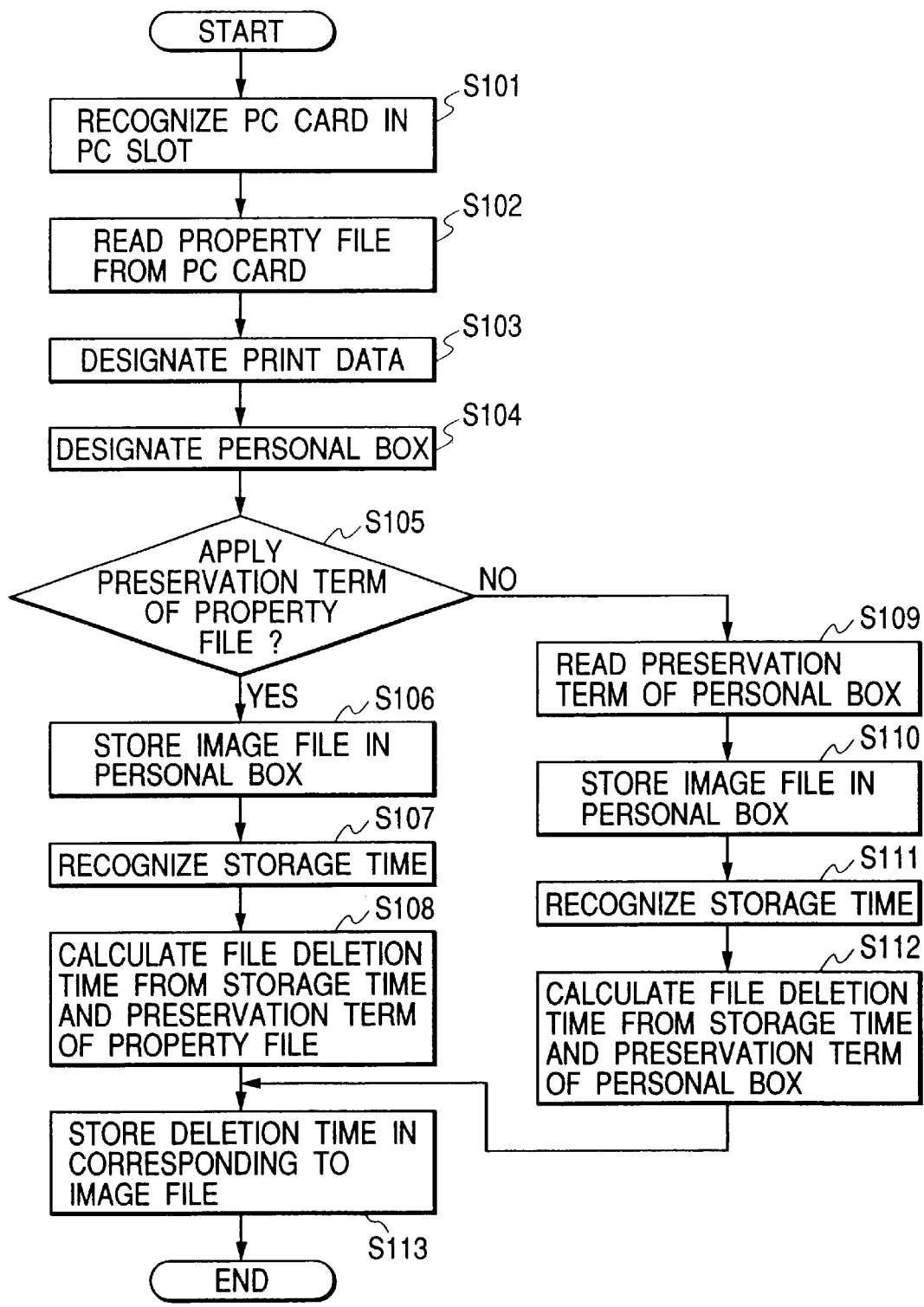
FIG. 14 is a flowchart showing an example of a processing procedure by the controller 110 in FIG. 1 after image data was received from a PC card 180.

FIG. 14 is a flowchart showing an example of a processing procedure by the controller 110 in FIG. 1 after the image data was received from the PC card 180. In step S101, when it is recognized that the PC card 180 has been set into the PC slot of the image I/O apparatus 1, the image data file designating picture plane as shown in FIG. 8 is displayed on the operating unit 150. In step S102, only the property file is read out of the PC card 180 and the image data file name is displayed on the image data file designating picture plane.

In step S103, when one of the print data file designate keys 901 to 903 is operated and the OK button 906 is operated or when one of the image data designate keys 901 to 903 is operated, an "apply preservation term of personal box" button 909 is operated, and the OK button 906 is operated, the screen is switched from the image data file designating picture plane to the personal box designating picture plane as shown in FIG. 10.

When one of the buttons 701 to 703 on the displayed personal box designating picture plane is operated and the personal box to store the image data file is designated in step S104, whether the "apply preservation term of personal box" button 909 is not operated on the image data file designating picture plane in FIG. 8 or not, namely, whether the preservation term described in the property file is applied or not is discriminated in step S105.

If it is determined that the "apply preservation term of personal box" button 909 is not operated, namely, if it is determined that the preservation term described in the property file is applied, the image data file is stored in the designated personal box in step S106. A storage time of the image data file to the personal box is recognized in step S107. A deletion time of the image data file is calculated from the recognized time and the preservation term described in the property file in step S108. The obtained deletion time is stored in the personal box in correspondence to the image data file in step S113.

On the other hand, if it is determined that the "apply preservation term of personal box" button 909 has been operated, namely, if it is determined that the preservation term described in the property file is not applied, the preservation term of the relevant personal box which has previously been set is read out in step S109. The image data file is stored in the relevant personal box in step S110. The storage time of the image data file to the personal box is recognized in step S111. A deletion time is calculated from the recognized time and the read-out preservation term in step S112. The obtained deletion time is stored in the personal box in correspondence to the image data file in step S113.

Figures 15, 16:
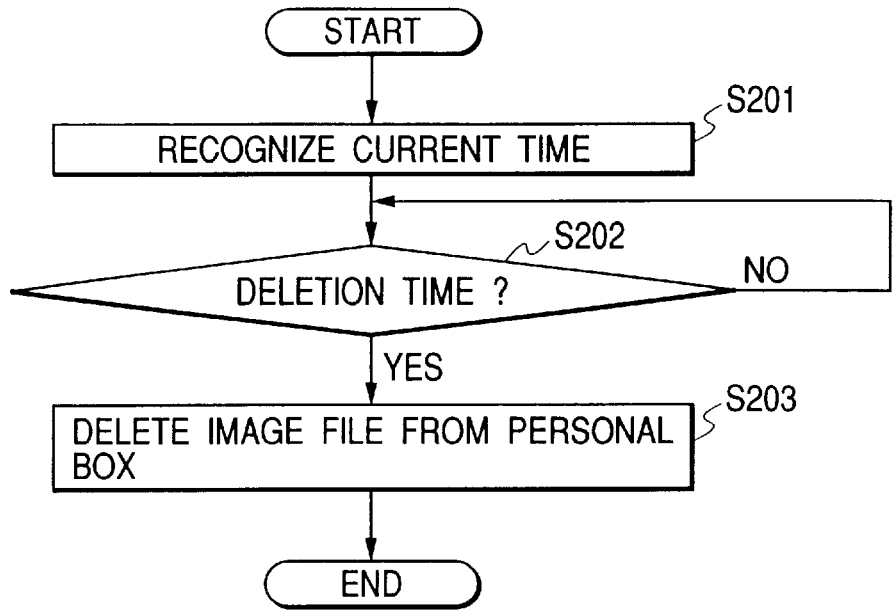
FIG. 15 is a flowchart showing an example of a deleting procedure of an image data file by the controller 110 in FIG. 1.
FIG. 16 is a diagram showing an example of a print data preservation list.

FIG. 15 is a flowchart showing an example of a deleting procedure of the image data file by the controller 110 in FIG. 1. In step S201, the current time is recognized and the recognized time is compared with the deletion time which has already been stored in each personal box in step S202. When the recognized time reaches the deletion time, the image data file associated with the deletion time is deleted from the personal box in step S203.

According to the deletion of the image data file described above, each time the current time is obtained, the obtained current time is compared with the deletion time associated with each personal box. Therefore, there is a limitation to reduction of the time that is required for the comparing process and such a time cannot be reduced any more.

When the obtained deletion time is stored in correspondence to the print data (step S008 in FIG. 13, step S113 in FIG. 14), therefore, a print data preservation list (refer to FIG. 16) having, for example, an index, a user name, an image data file name, and a deletion time as internal variables is simultaneously formed. In this print data preservation list, the internal variables are sorted in the ascending order of the deletion time, namely, the internal variables are arranged in order from the early deletion time. The obtained rearranged print data preservation list is stored. After that, the current time is compared with the deletion time arranged at the highest order. If the print data was deleted, the internal variables including the relevant deletion time are deleted from the print data preservation list, and the time which is required for the comparing process between the current time and the deletion time can be also further reduced.

It is also possible to construct the apparatus in such a manner that the current time is compared with the deletion time of the internal variable whose index number is equal to 1 in place of comparing the current time with the deletion time arranged at the highest order and, moreover, in the case where the image data file whose index number is equal to 1 is deleted, the items corresponding to the deleted image data file are also deleted from the image data file preservation list, and after that, the index number of the remaining image data file in the image data file preservation list is reduced by 1.

Therefore, for example, if the preservation term set in the personal box held by Mr. Sato of box No. 0 is equal to 5 days, the image data file stored in the personal box held by Mr. Sato is automatically deleted from the personal box held by Mr. Sato at a point when 5 days elapse from the time when it has been stored in the personal box held by Mr. Sato.

Third Embodiment

The third embodiment differs from the first embodiment with respect to a point that whether the preservation term is included as a parameter in the property file or not is discriminated. If it is determined as a result of the discrimination that the preservation term is not included as a parameter in the property file, the preservation term of the print data can be set by operating the operating unit 150. If the preservation term was set, the deletion time of the relevant print data is calculated on the basis of the set preservation term and the obtained current time.

The objects of the invention can be also accomplished by a method whereby the storage medium in which program codes of software to realize the functions of the embodiments as mentioned above have been recorded is supplied to a system or an apparatus, and a computer (or a CPU (central processing unit) or an MPU (microprocessor unit)) of the system or apparatus reads out and executes the program codes stored in the storage medium.

In this case, the program codes themselves read out from the storage medium realize the novel functions of the invention, and the storage medium in which the program codes have been stored constructs the invention.

As a storage medium for supplying the program codes, for example, it is possible to use a floppy disk, a hard disk, an optical disk, a magnetooptic disk, a CD-ROM (compact disk ROM), a CD-R (compact disk recordable), a magnetic tape, a non-volatile memory card, an ROM (read only memory), or the like.

The invention obviously incorporates not only a case where the functions of the embodiments mentioned above are realized by a method whereby the computer executes the read-out program codes but also a case where an OS (operating system) or the like which is operating on the computer executes a part or all of the actual processes on the basis of instructions of the program codes and the functions of the embodiments mentioned above are realized by those processes.

Further, the invention also incorporates a case where the program codes read out of the storage medium are written in a memory equipped for a function expanding board inserted to a computer or a function expanding unit connected to a computer and, thereafter, a CPU or the like provided for the function expanding board or function expanding unit executes a part or all of the actual processes on the basis of the instructions of the program codes, and the functions of the embodiments mentioned above are realized by those processes.

As described above, according to the invention, since the apparatus has been constructed as mentioned above, the user can store the image data file stored in the removable external storage medium into the personal memory area and can print the image on the basis of the property of the image data file.

According to the invention, since the apparatus has been constructed as mentioned above, the preservation term described in the property file stored in the removable external storage medium can be applied as a preservation term.

What is claimed is:

1. An image data registering apparatus comprising:
   a connecting unit for connecting a detachable memory for storing image data and information showing a preservation term of the image data;
   a registering unit for registering the image data read out from the memory;
   a calculating unit for calculating a deletion time on the basis of information showing the preservation term read out from the memory and a current time; and
   a deleting unit for deleting the image data registered by said registering unit on the basis of the information showing the preservation term read out from the memory and the deletion time calculated by said calculating unit.

2. An apparatus according to claim 1 further comprising:
   an input unit for inputting a password;
   an image data designating unit for designating image data designated by the user from the image data registered by said registering unit; and
   a printing unit for printing the image data designated by said image data designating unit if the password inputted by said input unit is valid.

3. An apparatus according to claim 1 wherein the area includes a personal box.

4. An image data registering apparatus comprising:
   a connecting unit for connecting a detachable memory for storing image data and information showing a preservation of the image data;
   a registering unit for registering the image data read out from the memory;
   a selecting unit for selecting as a preservation term either the information showing a preservation of the image read out from the memory or a preset preservation term; and
   a deleting unit for deleting the image data registered by said registering unit on the basis of the preservation term.

5. An image data registering method comprising:
   a registering step of registering image data read out from a detachable memory for storing image data and information showing a preservation term of the image data;
   a calculating step of calculating a deletion time on the basis of information showing the preservation term read out from the memory and a current time; and
   a deleting step of deleting the image data registered in said registering step on the basis of the information showing the preservation term read out from memory and the deletion time calculated in said calculating step.

6. A method according to claim 5 further comprising:

an input step of inputting a password;

an image data designating step of designating image data designated by the user from the image data registered in said registering step; and a printing step of printing the image data designated in said image data designating step if the password inputted in said input step is valid.

7. A method according to claim 5, wherein the area includes a personal box.

8. An image data registering method comprising:

a registering step of registering image data read out from a detachable memory for storing image data and information showing a preservation of the image data;

a selecting step of selecting as a preservation term either the information showing a preservation of the image read out from the memory or a preset preservation term; and a deleting step of deleting the image data registered in said registering step on the basis of the information showing the preservation term read out from the memory.

9. A storage medium for storing an image data registering program, wherein the image data registering program comprises:

registering code for registering image data read out from a detachable memory for storing said image data and information indicative of a preservation term of the image data;

calculating code for calculating a deletion time on the basis of information showing the preservation term read out from the memory and a current time; and deleting code for deleting the image data registered by said registering code on the basis of the information indicative of the preservation term read out from the memory and the deletion time calculated by said calculating code.

10. A product of an image data registering program, wherein said image data registering program comprises:

registering code for registering image data read out from a detachable memory for storing said image data and information indicative of a preservation term of the image data;

selecting code for selecting as a preservation term either the information showing a preservation of the image read out from the memory or a preset preservation term; and deleting code for deleting the image data registered by said registering code on the basis of the information indicative of the preservation term read out from the memory.

11. An image data registering apparatus comprising:

a registering unit for registering image data read out from a memory in which the image data and information showing a preservation term of the image data are stored;

a calculating unit for calculating a deletion time on the basis of the information showing the preservation term read out from the memory and a current time; and a deleting unit for deleting the image data registered by said registering unit on the basis of the deletion time calculated by said calculating unit.

12. An image data registering method comprising:

a registering step of registering image data read out from a memory in which the image data and information showing a preservation term of the image data are stored;

a calculating step of calculating a deletion time on the basis of the information showing the preservation term read out from the memory and a current time; and a deleting step of deleting the image data registered in said registering step on the basis of the deletion time calculated in said calculating step.

* * * * *

UNITED STATES PATENT AND TRADEMARK OFFICE
CERTIFICATE OF CORRECTION

PATENT NO.    : 6,823,092 B1
DATED         : November 23, 2004
INVENTOR(S)   : Hirochika Sato It is certified that error appears in the above-identified patent and that said Letters Patent is hereby corrected as shown below:

<u>Title page,</u>
Item [*] Notice, should read:

-- Subject to any disclaimer, the term of this
   patent is extended or adjusted under 35
   U.S.C. 154(b) by 616 days. --.

Signed and Sealed this

Thirteenth Day of September, 2005

JON W. DUDAS
*Director of the United States Patent and Trademark Office*